United States Patent
Wang et al.

(10) Patent No.: US 6,797,941 B2
(45) Date of Patent: Sep. 28, 2004

(54) RELIABLE OPTICAL ADD/DROP DEVICE

(75) Inventors: Chin-Hsiang Wang, Taichung (TW); Chih-Hsiang Lin, Taichung (TW); Tsung-Yueh Tsai, Taichung (TW)

(73) Assignee: Asia Optical Co., Inc. (TW)

( * ) Notice: Subject to any disclaimer, the term of this patent is extended or adjusted under 35 U.S.C. 154(b) by 105 days.

(21) Appl. No.: 10/244,510

(22) Filed: Sep. 17, 2002

(65) Prior Publication Data

US 2004/0026607 A1 Feb. 12, 2004

(51) Int. Cl.⁷ .................................................. H01J 5/02

(52) U.S. Cl. .................................... 250/239; 250/227.23

(58) Field of Search ........................... 250/239, 227.11, 250/227.21, 227.23, 216; 385/92, 9, 17, 28, 60

(56) References Cited

U.S. PATENT DOCUMENTS 6,659,659 B1 * 12/2003 Malone ........................ 385/94

* cited by examiner

Primary Examiner—Que T. Le

(57) ABSTRACT

A highly reliable optical add/drop device is described. The optical add/drop device has an external tube and a ring, wherein the external tube and the ring are made of metallic material. A WDM filter is fixed in the ring. The ring is inserted in the external tube at the middle portion and fixed therein by soft solder technique. A single fiber collimator and a dual fiber collimator are respectively coupled with the opposite surfaces of the filter, and aligned in the external tube. Additionally, the single and dual fiber collimators are also fixed therein by soft solder technique, as two metal tubes respectively hold the single and dual fiber collimators. In the invention, the WDM filter is rigidly fixed to avoid tilting during temperature variation. Moreover, the invention provides an optical add/drop device with low insertion loss and reflection loss.

19 Claims, 4 Drawing Sheets

RELIABLE OPTICAL ADD/DROP DEVICE

BACKGROUND OF THE INVENTION

1. Field of Invention

The present invention relates to an optical device. More particularly, the present invention relates to a highly reliable optical add/drop device.

2. Description of Related Art

In optical fiber technology, optical add/drop (OAD) devices, sometimes referred as wavelength division multiplexed units, are used to combine or separate optical signals having different wavelengths. The OAD devices have been utilized to significantly enhance the signal capacity of optical communication systems. An OAD system simultaneously transmits multiple information signals on a single waveguide medium at different wavelengths or channels. Examples of such communication systems include telecommunication systems, cable television systems, local area networks (LANs) and wide area networks (WANs). As highly developing of optical communication, the requirements for OAD devices with high performance and reliability are increased.

The reliability of OAD devices generally depends on the designing and packaging technology. In conventional OAD devices, one way to assemble the OAD devices is bonding all optical parts together by applying epoxy. A typical structure of the OAD device includes a dual fiber collimator with a first gradient index (GRIN) lens, a wavelength division multiplexed (WDM) filter and a single fiber collimator with a second GRIN lens. A light beam carried on a plurality of wavelengths are multiplexed together or demultiplexed separately for transmission by the OAD devices. A light beam having different wavelengths is input into a conventional OAD device via one fiber of the dual fiber collimator. The light beam is transmitted to the first GRIN lens for collimating, and then incident on the WDM filter. The light passing through the WDM filter is transmitted to the single fiber collimator. The remainder of the composite signal is reflected back to the first GRIN lens and then transmitted to another optical fiber.

In one type of conventional OAD device, the WDM filter is fixed on one end surface of the first GRIN lens based on epoxy bonding. Therefore, the angle between the filter and the incident light is adjusted to achieve a lowest transmission loss, and fixed. Thereafter, the single fiber collimator and the dual fiber collimator are then packaged by applying a heat-curing epoxy to assemble the OAD device. The conventional packaging structure provides the OAD devices with good performance. However, the OAD devices according to conventional method have a risk of failure when they are operated during temperature variation. In general, the epoxy applied on the edge of the filter and the first GRIN lens non-uniformly expands or shrinks during temperature variation, and tilts the filter. Further, the light beam emitted from the WDM filter may deviate, and thus the insertion loss and reflection loss are increased. Because of the expansion and shrinkage problem of the epoxy, there is still a need in the art to provide new packaging structure by decreasing the usage of epoxy to obtain highly reliable operation.

SUMMARY OF THE INVENTION

It is therefore an object of the present invention to provide a reliable OAD device in which a ring is used to mount a filter therein, and thereby prevent the filter from tilting.

It is another object of the present invention to provide a reliable OAD device, in which by soldering the ring with an external tube via the openings at the middle sidewall of the external tube, the ring with the filter therein and other optical parts of the OAD device can be packaged rigidly. Hence, the OAD device can be reliably performed during temperature variation.

In one aspect, the present invention provides a structure for packaging an optical add/drop (OAD) device with a filter. The structure includes a ring and an external tube. At least three corners of the filter contact the inner sidewall of the ring, and the filter tightly wedges in the ring. The external tube has an inner diameter substantially equal to the outer diameter of the ring. The external tube has at least one opening at the middle sidewall, and the ring is positioned in the external tube to block the opening. Moreover, the ring is soldered with the external tube to combine them together.

In another aspect, the present invention provides an optical add/drop device that includes a filter, a ring, an external tube, a single fiber collimator and a dual fiber collimator. At least three corners of the filter contact the inner sidewall of the ring, and the filter wedges in the inner hole of the ring. An external tube has an inner diameter substantially equal to the outer diameter of the ring. The external tube has a middle group of openings in the middle sidewall, and two groups of openings adjacent to the terminal ends of the external tube respectively. As the ring is positioned at the middle of the external tube to block the center openings, the sidewall of the ring is seen via the center openings. The ring is soldered with external tube via the center openings so as to fix the ring in the external tube. The single fiber collimator and the dual fiber collimator are coupled to each other in the external tube by soldering the inner metal tubes with the external tube via the another two groups of openings, respectively.

According to the OAD device of the present invention, the filter can be well fixed in the external tube through the ring. By soldering the ring, the inner metal tube of the dual fiber collimator and the inner metal tube of the single fiber collimator with the external tube via the openings, the optical parts can be well assembled inside the external tube. Therefore, optical path shift in conventional OAD device caused by the degradation and deformation of epoxy can be eliminated to attain high performance and reliability.

The feature of the invention is that the diameter of each center openings is less than the thickness of the ring. As the external tube and the ring are made of metal, the ring and the external tube can be soldered together via the middle openings without utilizing any adhesive material.

BRIEF DESCRIPTION OF THE DRAWINGS

These and other features, aspects, and advantages of the present invention will become better understood with regard to the following description, appended claims, and accompanying drawings, wherein:

DESCRIPTION OF THE INVENTION

The present invention provides an optical add/drop (OAD) device that includes a ring and an external tube to assemble all optical parts into a fixed optical path in a high thermal environment and during long-term operation without a heat absorption problem, thereby to obtain high reliability.

Figure 1:
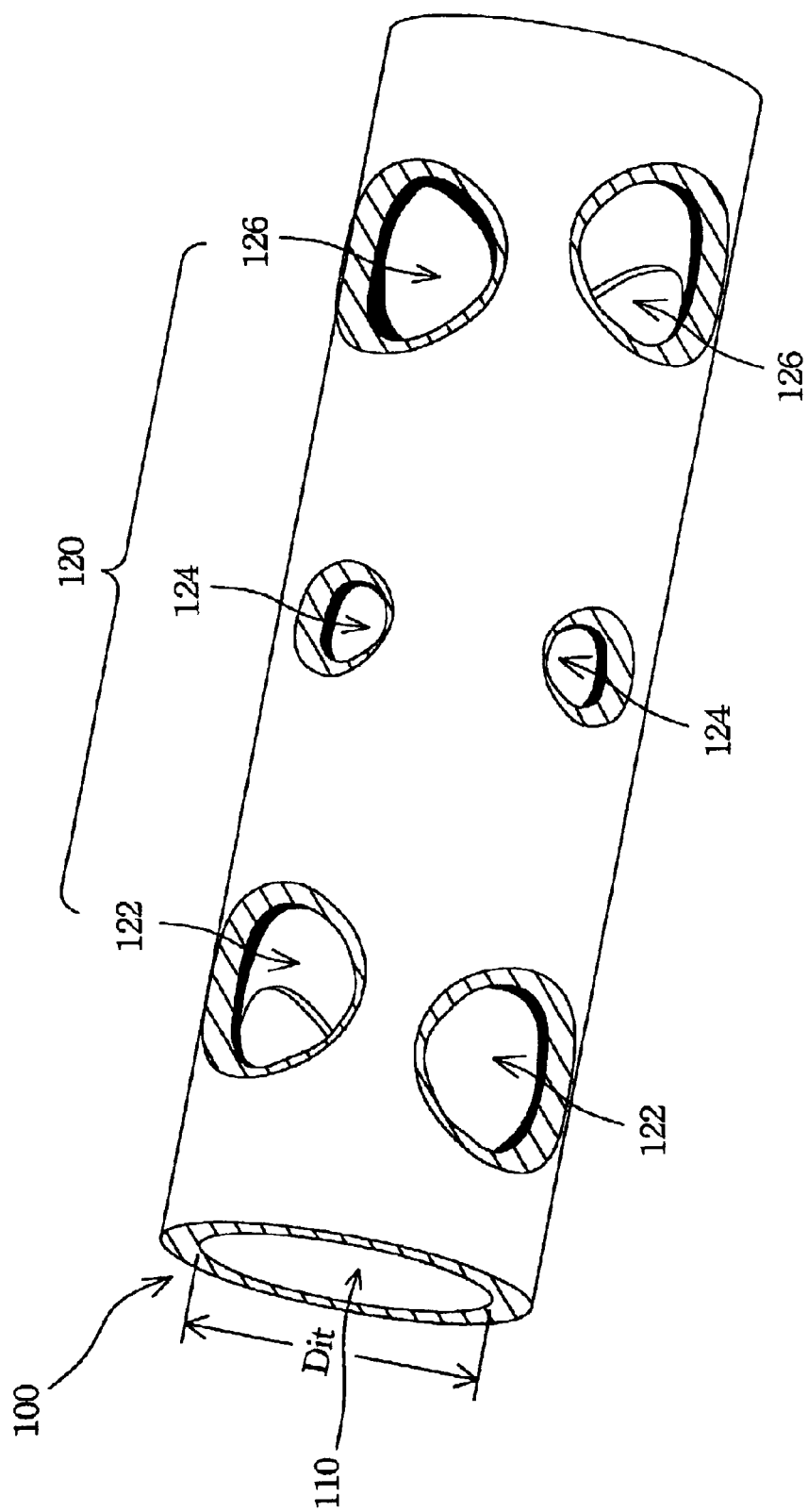
FIG. 1 is a schematic perspective view of an external tube according to one preferred embodiment of the present invention.

FIG. 1 is a schematic perspective view of an external tube according to one preferred embodiment of the present invention. Referring to FIG. 1, the external tube 100 is a cannular tube, of which the center portion is hollow, so the external tube 100 has a center hole 110 in the center of the tube. The inner diameter of the external tube 100 is Dit. The external tube 100 has a plurality of openings 120 on the sidewall of the external tube 100. Among the openings 120, a first group of the openings 124 is set circularly around the annular sidewall. The first group of the openings 124 may include four circular openings that are used to tetragonal-fix an optical part inside the external tube 100. The second and third groups of the openings 122, 126 are set circularly around the annular sidewall of the external tube 100 adjacent to the terminal end of the external tube 100, respectively. In other words, the second group of the openings 122 is set adjacent to one end of the external tube 100, and the third group of the openings 126 is set adjacent to the other end. The second and third groups of the openings 122, 126 may also include four circular holes to fix optical parts, respectively.

Figure 2:
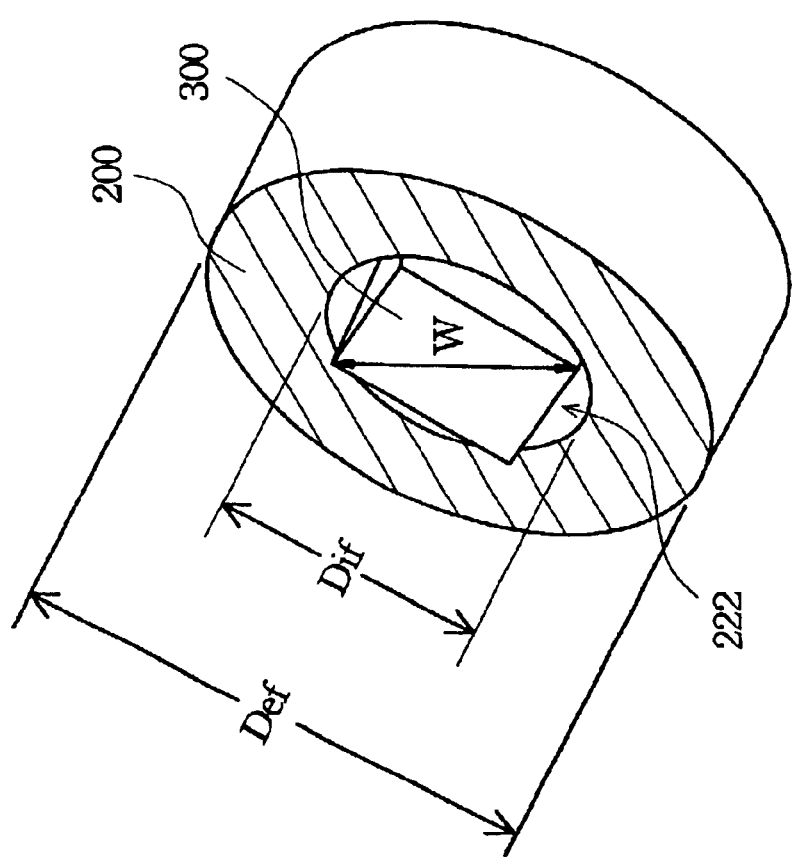
FIG. 2 is a schematic perspective view of a fixing ring according to one preferred embodiment of the present invention.
Figure 3:
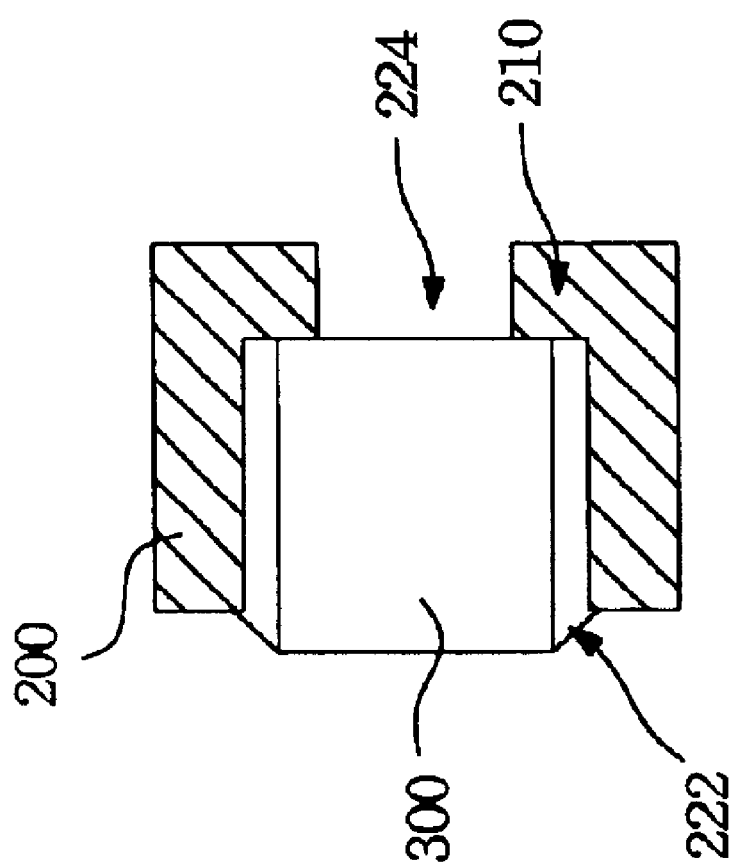
FIG. 3 is a schematic cross-sectional view of the fixing ring of FIG. 2.

FIG. 2 is a schematic perspective view of a ring according to one embodiment of the present invention. FIG. 3 is a schematic cross-section corresponding to FIG. 2. Referring to FIGS. 2 and 3 simultaneously, the ring 200 is circular, and made of a metal, a glass, or other compatible materials. The ring 200 has an outer diameter Def. The outer diameter Def of the ring 200 is substantially equal to the inner diameter Dit of the external tube 100. The ring 200 has an interior hole 222, and the inner diameter of the ring 200 is Dif. In the invention, the external tube 100 and the ring 200 are preferably made of metallic material, such as stainless steel.

An optical filter 300 is positioned into the interior hole 222 of the ring 200. The filter 300 includes a wavelength division multiplexed (WDM) filter, a dense WDM (DWDM) filter, a coarse WDM (CWDM), a wide-band WDM (WWDM) or a narrow-band WDM (NWDM). The filter 300 typically has a tetragonal structure as shown in FIG. 2. The diagonal length W of the filter 300 is substantially equal to the inner diameter Dif of the ring 200. The filter 300 is wedged in the interior hole 222 tightly such that at least three corners of the filter 300 touch the sidewall of the interior hole 222. Additionally, an adhesive material (not shown), such as heat-curing epoxy, is applied to the corners of the filter 300 and the gap between the filter 300 and the sidewall of the ring 200 so as to ensure the filter 300 being fixed in the ring 200. Consequently, the filter 300 doesn't directly adhere to the GRIN lens of the collimator. The filter 300 is steadily fixed in the ring 200, even if the epoxy has a little thermal deformation, so that optical path deviation problem will not occur.

Referring to FIG. 3, when the filter 300 is fixed in the ring 200, the filter 300 can be stopped by a stop portion 210. The stop portion 210 is at one side of the interior hole 222, at the end of the filter 300, thereby to assist in the mounting of the filter 300 in the ring 200. For example, as the shape of the stop portion 210 is circular, the hole 224 inside the portion 210 is smaller than the interior hole 222. Except for the circular shape, the stop portion 210 can be at least two protrusions to stop the filter 300 at the desired position in the interior hole 222. Of course, the stop portion 210 can be modified to other shapes without blocking light from traveling through the ring 300.

Figure 4:
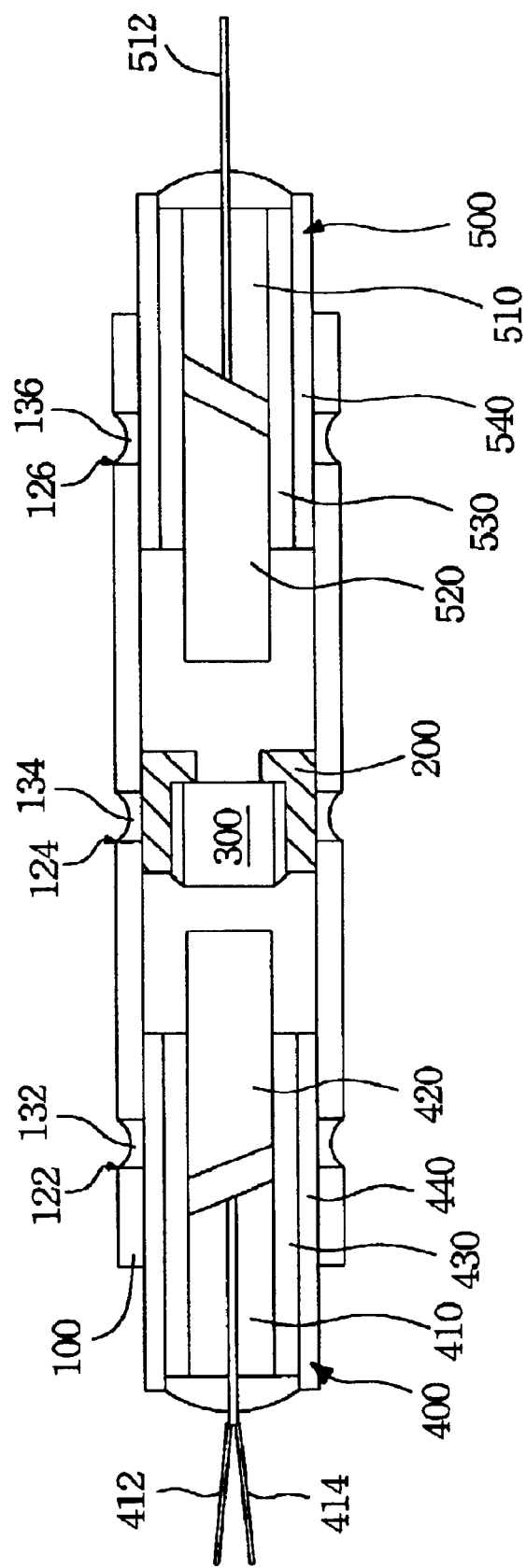
FIG. 4 is a schematic cross-sectional view of an optical add/drop device according to one preferred embodiment of the present invention.

FIG. 4 is a schematic cross-section of an OAD device according to one embodiment of the present invention. Referring to FIG. 4, after the filter 300 is fixed in the ring 200, the ring 200 holding the filter 300 is placed in the external tube 200. Next, the ring 200 is positioned in the external tube 100 corresponding to the position of the middle group of the openings 124. Because the thickness of the ring 200 is larger than the diameter of each opening 124, the ring 200 blocks the middle group of the openings 124. Any of various fusible materials 134, such as tin or lead, is positioned in the middle group of the openings 124, and heated so as to solder the ring 200 and the external tube 100 together. In another way, the ring 200 holding the filter 300 therein can be fixed in the external tube 100 by applying adhesive material in the middle group of the openings 124. Consequently, the temperature variation cannot tilt the filter 300, because the filter 300 is rigidly fixed in the external tube 100.

After fixing the ring 200 in the external tube 100, a dual fiber collimator 400 and a single fiber collimator 500 are packaged into the external tube 100 to form the OAD device of the present invention. The dual fiber collimator 400 includes a first glass ferrule 410 grasping a pair of fibers 412, 414, a first GRIN lens 420, and a first glass tube 430 holding the first glass ferrule 410 and the first GRIN lens 420. The first glass ferrule 410 grasping the fibers 412, 414 is aligned with the first GRIN lens 420 within the first glass tube 430. After the dual fiber collimator 400 obtains a lowest reflection loss, the first glass ferrule 410 and the first GRIN lens 420 are fixed in the first glass tube 430 by using adhesive material. Further, a first metal tube 440 having an outer diameter equal to the inner diameter of the external tube 100 is employed to sheathe the first glass tube 430, wherein an adhesive material (not shown) is applied between the first metal tube 440 and the first glass tube 430 to combine them. The dual fiber collimator 400 is inserted in one end of the external tube 100 adjacent to the filter 300, and blocks the second group of the openings 122. In this case, the gap between the dual fiber collimator 400 and the filter 300 tends to zero. Next, the fusible material 134 mentioned above is positioned in the second group of the openings 122, and heated so as to solder the first metal tube 440 and the external tube 100 together. In another way, the dual fiber collimator 400 having the first metal tube 440 can be fixed in the external tube 100 by applying adhesive material in the second group of the openings 124.

Similarly, the single fiber collimator 500 includes a second glass ferrule 510 grasping a fiber 512, a second GRIN lens 520, and a second glass tube 530 holding the second glass ferrule 510 and the second GRIN lens 520. The second glass ferrule 510 grasping the fiber 512 and the second GRIN lens 520 are inserted in the second glass tube 530, and then a beam transmitted in the fiber 512 is incident on the second GRIN lens 520. After obtaining collimating light from the second GRIN lens 520, the second glass ferrule 510 and the second GRIN lens 520 are fixed in the second glass tube 530 by using adhesive material. A second metal tube 540 having an outer diameter equal to the inner diameter of the external tube 100 is employed to sheathe the second glass tube 530, wherein an adhesive material (not shown) is applied between the second metal tube 540 and the second glass tube 530 to combine them. The single fiber collimator 500 is inserted in the other end of the external tube 100 opposite to the dual fiber collimator 400. Next, the single fiber collimator 500 is aligned with the dual fiber collimator 400 to obtain the lowest insertion loss. After obtaining the lowest insertion loss and the optimum position of the single fiber collimator 500 relative to the dual fiber collimator 400, the fusible material 134 mentioned above is positioned in the third group of the openings 126, and heated so as to solder the second metal tube 540 and the external tube 100 together. In another way, the single fiber collimator 500 having the second metal tube 540 can be fixed in the external tube 100 by applying adhesive material in the third group of the openings 126.

According to above description, the present invention provides an OAD device, which has a ring for fixing a filter therein and an external tube with openings on the sidewall. The ring fixing a filter therein, the dual fiber collimator and the single fiber collimator are soldered with the external tube, so all of the optical parts are steadily packaged inside the external tube. The OAD device of the invention has better reliability in the long-time high-power operation.

As is understood by a person skilled in the art, the foregoing preferred embodiments of the present invention are illustrative of the present invention rather than limiting of the present invention. It is intended that various modifications and similar arrangements included within the spirit and scope of the appended claims be covered, the scope of which should be accorded the broadest interpretation so as to encompass all such modifications and similar structure.

What is claimed is:

1. A structure for packaging an optical add/drop device including a filter, a dual fiber collimator and a single fiber collimator, comprising:
   a ring made of metallic material and tightly holding the filter therein;
   an external tube made of metallic material, having an inner diameter substantially equal to the outer diameter of the ring, and having a first opening on its sidewall, wherein the ring is inserted in the external tube to block the first opening, and the dual fiber collimator and single fiber collimator are positioned at both sides of the filter in the external tube; and
   a fusible material positioned in the first opening and heated so as to solder the ring and the external tube together.

2. The structure according to claim 1, wherein the filter is one selected from the group consisting of the WDM filter, the DWDM filter, the WWDM filter, the CWDM filter and the NWDM filter.

3. The structure according to claim 1, wherein the ring includes a stop portion in one side of the interior hole of the ring to locate the filter at a predetermined position.

4. The structure according to claim 1, further comprising an adhesive material applied to the corners of the filter and the gap between the filter and the sidewall of the ring so as to ensure the filter being fixed in the ring.

5. The structure according to claim 1, further comprising:
   a first metal tube holding the dual fiber collimator and fixed in the external tube; and
   a second metal tube holding the single fiber collimator and fixed in the external tube;
   wherein the first and second metal tubes are respectively positioned at both sides of the filter.

6. The structure according to claim 5, wherein the external tube further has a second opening and third opening respectively located at both sides of the first opening, and the first and second metal tubes in the external tube respectively block the second and third openings so as to position and heat the fusible materials in the second and third openings.

7. The structure according to claim 5, wherein the first and second metal tubes are fixed in the external tube by applying the adhesive material in the second and third openings.

8. An optical add/drop device, comprising:
   a filter;
   a ring made of metallic material and tightly holding the filter therein;
   an external tube having an inner diameter substantially equal to an outer diameter of the ring, and a first opening on the middle sidewall, wherein the ring is inserted in the external tube to block the first opening;
   a dual fiber collimator fixed in the external tube and adjacent to one end surface of the filter;
   a single fiber collimator fixed in the external tube and adjacent to another end surface of the filter; and
   a fusible material positioned in the first opening and heated so as to solder the ring and the external tube together.

9. The device according to claim 8, wherein the filter is one selected from the group consisting of the WDM filter, the DWDM filter, the WWDM filter, the CWDM filter and the NWDM filter.

10. The device according to claim 8, wherein the ring includes a stop portion in one side of the interior hole of the ring to locate the filter at a predetermined position.

11. The device according to claim 8, further comprising an adhesive material applied to the corners of the filter and the gap between the filter and the sidewall of the ring so as to ensure the filter being fixed in the ring.

12. The device according to claim 8, further comprising:
    a first metal tube holding the dual fiber collimator and fixed in the external tube; and
    a second metal tube holding the single fiber collimator and fixed in the external tube;
    wherein the first and second metal tubes are respectively positioned at both sides of the filter.

13. The device according to claim 12, wherein the external tube further has a second opening and third opening respectively located at both sides of the first opening, and the first and second metal tubes in the external tube respectively block the second and third openings so as to position and heat the fusible materials in the second and third openings.

14. The device according to claim 12, wherein the first and second metal tubes are fixed in the external tube by applying the adhesive material in the second and third openings.

15. A structure for packaging an optical add/drop device including a filter, a dual fiber collimator and a single fiber collimator, comprising:
    a ring holding the filter tightly therein;
    an external tube having an inner diameter substantially equal to the outer diameter of the ring, and having a first opening on its sidewall, wherein the ring is inserted in the external tube to block the first opening, and the dual and single fiber collimators are respectively positioned at both sides of the filter in the external tube; and
    an adhesive material applied in the first opening and infiltrated between the ring and external tube so as to combine the ring with the external tube, and applied to the corners of the filter and the gap between the filter and the sidewall of the ring so as to ensure the filter being fixed in the ring.

16. The structure according to claim 15, wherein the ring includes a stop portion in one side of the interior hole of the ring to locate the filter at a predetermined position.

17. The structure according to claim 15, further comprising:
   a first metal tube holding the dual fiber collimator and fixed in the external tube; and
   a second metal tube holding the single fiber collimator and fixed in the external tube;
   wherein the first and second metal tubes are respectively positioned at both sides of the filter.

18. The structure according to claim 17, wherein the external tube further has a second opening and third opening respectively located at both sides of the first opening, and the first and second metal tubes in the external tube respectively block the second and third openings so as to position and heat the fusible materials in the second and third openings.

19. The structure according to claim 17, wherein the first and second metal tubes are fixed in the external tube by applying the adhesive material in the second and third openings.

* * * * *